No. 890,305. PATENTED JUNE 9, 1908.
D. R. SAUNDERS.
HANDLE FOR BASKETS OR THE LIKE.
APPLICATION FILED FEB. 9, 1907.
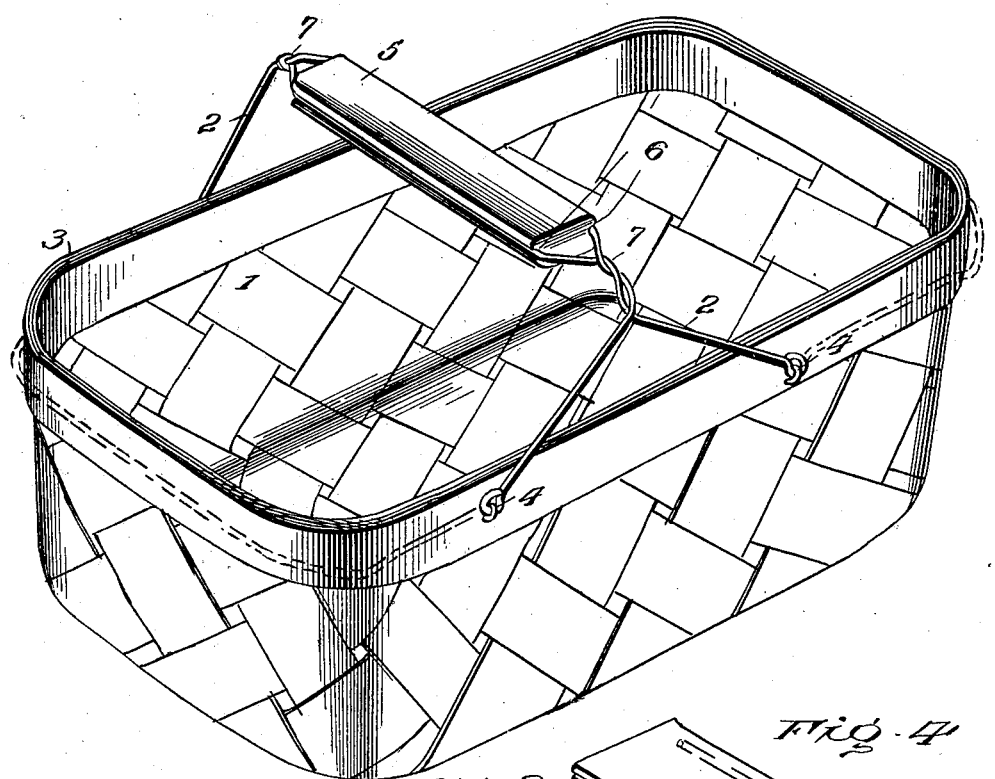
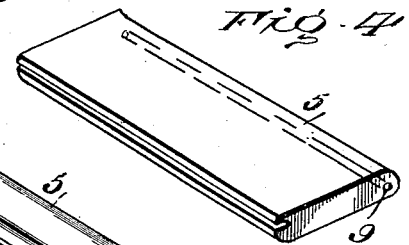
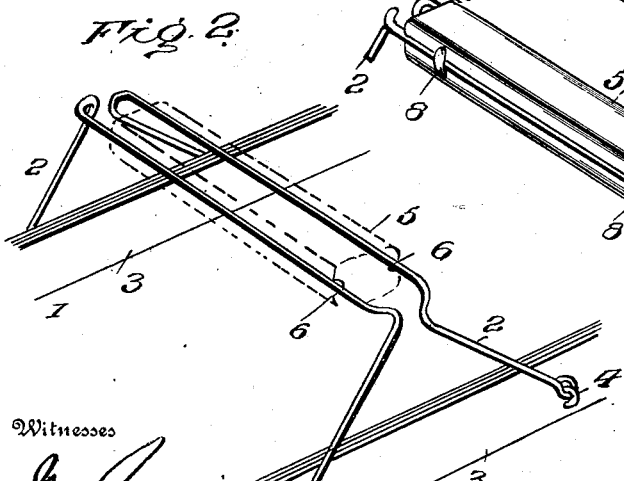
Witnesses
Inventor
D. R. Saunders
By R. L. A. P. Lacey,
Attorneys

UNITED STATES PATENT OFFICE.

DAVID R. SAUNDERS, OF COLUMBUS, MISSISSIPPI.

HANDLE FOR BASKETS OR THE LIKE.

No. 890,305.　　　Specification of Letters Patent.　　　Patented June 9, 1908.

Application filed February 9, 1907. Serial No. 356,591.

*To all whom it may concern:*

Be it known that I, DAVID R. SAUNDERS, citizen of the United States, residing at Columbus, in the county of Lowndes and State of Mississippi, have invented certain new and useful Improvements in Handles for Baskets or the Like, of which the following is a specification.

The object of the present invention is to provide an improved handle for use in connection with baskets or similar receptacles, the said handle being peculiarly designed so as to be folded against the basket and occupy a minimum amount of space when being transported, thereby enabling reduced shipping rates to be secured.

The invention also aims to so form the handle that the various parts can be easily and quickly assembled without the use of a tool and which will be strong and rigid and support and brace the basket from both ends thereof when in use.

For a full description of the invention and the merits thereof and also to acquire a knowledge of the details of construction and the means for effecting the result, reference is to be had to the following description and accompanying drawings, in which:

Figure 1 is a perspective view of a basket having the improved handle applied thereto, the bails being shown in dotted lines as folded against the basket in proper position for transportation and in full lines in the position assumed in use. Fig. 2 is a perspective view, the handle bar being shown in dotted lines. Fig. 3 is a perspective view of a modified form of handle bar. Fig. 4 is a similar view showing a further modification of the handle bar.

Corresponding and like parts are referred to in the following description and indicated in all the views of the drawings by the same reference characters.

The invention may be employed in connection with any suitable receptacle such as the basket 1 and generally speaking comprises a pair of bails and a handle interposed between the intermediate portions of the bails and having an interlocking connection therewith. In the present instance the bails 2 which may be formed of any suitable material such as wire are connected to the reinforcing band 3 extending around the rim of the basket, and this connection is shown as being accomplished by staples 4 engaging eyes at the extremities of the bails, although any suitable means might be employed for accomplishing the same result. The handle 5 is in the nature of an elongated bar and is provided upon opposite longitudinal sides thereof with recessed portions for receiving the bails 2 and securing an interlocking connection therewith.

In the preferred embodiment of the invention shown in Fig. 1 grooves 6 are formed in the opposite edges of the handle 5 and are designed to receive the intermediate portions of the bails 2. When the basket is not in use or is undergoing shipment the bails 2 are folded backwardly against the basket and the handle pieces 5 are packed between the baskets or in any desired manner. When it is desired to assemble the various members the bails 2 are swung upwardly and the handle 5 interposed between the same in such a manner that the intermediate portions of the bails are received in the grooves 6. The handle 5 is then revolved about its longitudinal axis, preferably through one complete revolution and the corresponding portions of the bails 2 at the opposite ends of the handle thereby twisted about each other and locked together as indicated at 7.

A slight modification is shown in Fig. 3 in which staples 8 are utilized to lock one of the bails 2 within one of the grooves 6, thereby preventing accidental loss of the handle. Another means for accomplishing the same result is shown in Fig. 4 in which one of the bails 2 is designed to be received within a longitudinal opening 9 extending through one side of the handle, the edge of the handle upon the opposite side being provided with the usual groove 6. The manner of assembling the various elements of the handle is the same with the two modifications as with the preferred form previously described. It will thus be apparent that a handle constructed in accordance with the present invention not only has the advantage of enabling the baskets or receptacles to be shipped at reduced rates, but also produces a rigid construction which supports and braces the receptacle upon both sides of the center thereof. Furthermore the bails and handle piece are extremely simple in their construction and can be manufactured at a comparatively small cost.

Having thus described the invention what is claimed as new is:

1. The combination of a receptacle, a pair of bails applied to the receptacle, and a handle interposed between intermediate portions of the bails and provided upon its opposite longitudinal sides with recessed portions to receive the bails, corresponding portions of the bails at each end of the handle being twisted together to produce an interlocking connection between the same and to maintain the bails in engagement with the handle.

2. The combination of a receptacle, a pair of bails applied to the receptacle, spaced portions of each bail being locked to corresponding portions of the opposite bail, and a handle interposed between the bails intermediate the locked portions thereof, the said handle being provided upon opposite sides with grooves for receiving the bails.

3. The combination of a receptacle, a pair of bails applied to the receptacle, spaced portions of each bail being twisted about corresponding portions of the opposite bail, and a handle interposed between the bails intermediate the twisted portions thereof, said handle being formed upon its opposite faces with grooves designed to receive the bails.

In testimony whereof I affix my signature in presence of two witnesses.

DAVID R. SAUNDERS. [L. S.]

Witnesses:
W. T. FOLSOM,
M. L. ARCHER.